G. VOWLES.
Potato Digger.
No. 78,345.
Patented May 26, 1868.
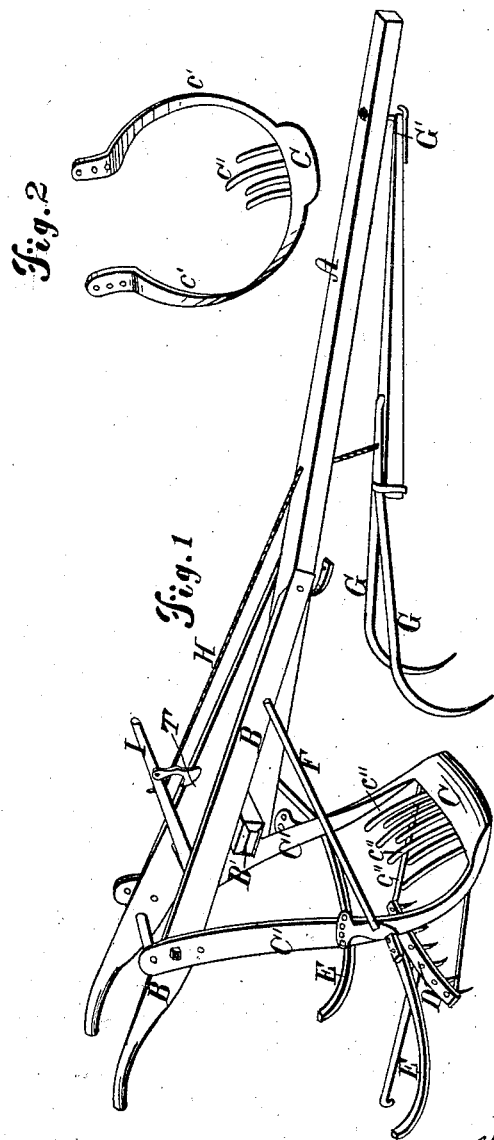
Witnesses.
Chas T Clausen
D. P. Holloway
Inventor
George Vowles
by
D. P. Holloway & Co
his attys

United States Patent Office.

GEORGE VOWLES, OF NEW HUDSON, MICHIGAN.

Letters Patent No. 78,345, dated May 26, 1868.

IMPROVEMENT IN POTATO-DIGGER.

*The Schedule referred to in these Letters Patent and making part of the same.*

TO ALL WHOM IT MAY CONCERN:

Be it known that I, GEORGE VOWLES, of New Hudson, in the county of Oakland, and State of Michigan, have invented a new and useful Improved Potato-Digger, and adapted as a bean-harvester; and I do hereby declare that the following is a full, clear, and exact description of the same, reference being had to the annexed drawings, making part of this specification, in which—

Figure 1 is a perspective view, and

Figure 2 is a perspective view of the knife intended for use as a bean-harvester.

The nature of my improvements will fully appear from the following specification and claims.

A is the tongue, and B the handle, for directing the machine, the tongue being attached to a cross-piece, B', fastened to the handles. C is the knife or shovel; it is a sharp blade, nearly straight on the edge, in the middle, curving towards the end, where it is connected with the outwardly-bowed arms $C^1$, which, extending upwards, are united to the handles by bolts, passing through a series of holes, by which the relative position of the knife can be adjusted.

On the back of the knife is attached a series of curved fingers, $C^2$, which are inclined towards the rear of the machine. These fingers are alternately longer and shorter, for the purpose of more completely pulverizing the soil, and throwing the potatoes to the surface, as the knife passes under the hills. D is a rake, hinged to the back of the knife, to which it is connected by a rod. This rake is intended merely for the purpose of throwing to the surface any potatoes which may have escaped the fingers on the knife. This rake may be stayed laterally by rods, attached to the ends of the knife.

The depth of the cut is regulated by adjustable springs E, attached to the arms $C^1$, as shown. Springs are used, so that on encountering stones or other irregularities on the surface, the driver, by bearing down on the handles, may keep the knife at its proper and uniform depth, the springs yielding to the pressure in passing over uneven surfaces. Stay-rods F are extended back from the front part of the handles to the arms $C^1$. These rods, when bent to enter the arms, are passed through holes in the end of spring, and form pivots, upon which the springs may turn in adjusting their height, by a bolt, passing through one of a series of holes in the arc on the end of the spring.

A hooked rake, G, is attached by a hooked bolt, under the tongue, so that it may be removed when not needed. It is intended to draw the vines to the front, so that they may pass more easily through the arms, without lodging thereon. The position of the rake, vertically, may be regulated by the cord H and lever I. When drawn back, the lever may be secured to the upper cross-stick of the handles by a hook, I'. It is to be raised in turning the machine.

When the machine is used for harvesting beans, the knife shown in fig. 2 is used, instead of the one shown in fig. 1. It may be attached to the handles and braces in the same way. When the machine is used for the latter purpose, the rakes G and D are removed.

What I claim as my invention, and desire to secure by Letters Patent, is—

1. The knife C, constructed with fingers $C^2$, and bowed arms $C^1$, by which it is adjustably attached to the handles B, and connected also therewith by the braces F, substantially as described.

2. In combination with the knife, the adjustable springs E, for regulating the depth of the cut, substantially as described.

3. In combination with the knife and fingers, the rake D, substantially as described.

4. The arrangement of the tongue A, handles B, and cross-brace B', and knife C, substantially as set forth.

In testimony whereof, I have signed my name to this specification in the presence of two subscribing witnesses.

GEORGE VOWLES,

Witnesses:
CLARK CRAWFORD,
JAMES G. PADLEY.